V. M. WEAVER.
METHOD OF DECOMPOSING COMPOUNDS.
APPLICATION FILED JAN. 24, 1916.

1,323,936.

Patented Dec. 2, 1919.

Inventor
Victor M. Weaver
By Brown, Hinson & Boettcher
Attys.

V. M. WEAVER.
METHOD OF DECOMPOSING COMPOUNDS.
APPLICATION FILED JAN. 24, 1916.

1,323,936.

Patented Dec. 2, 1919.
2 SHEETS—SHEET 2.

Inventor
Victor M. Weaver
By Brown, Hanson & Boettcher
Attys.

UNITED STATES PATENT OFFICE.

VICTOR M. WEAVER, OF HARRISBURG, PENNSYLVANIA, ASSIGNOR TO WEAVER COMPANY, OF MILWAUKEE, WISCONSIN, A CORPORATION OF WISCONSIN.

METHOD OF DECOMPOSING COMPOUNDS.

1,323,936.     Specification of Letters Patent.     Patented Dec. 2, 1919.

Application filed January 24, 1916. Serial No. 73,768.

*To all whom it may concern:*

Be it known that I, VICTOR M. WEAVER, a citizen of the United States, residing at Harrisburg, in the county of Dauphin and State of Pennsylvania, have invented a certain new and useful Improvement in Methods of Decomposing Compounds, of which the following is a full, clear, concise, and exact description, reference being had to the accompanying drawings, forming a part of this specification.

My invention relates to the art of electrochemistry and is concerned with a method of and apparatus for decomposing compounds. More particularly, my invention relates to the winning of substances by electrolysis, especially the winning of substances lighter than the electrolytic bath.

It will appear to those skilled in the art that, in the broader aspects of my invention, my method and apparatus may be variously employed and are not limited to operation upon certain specific compounds. On the other hand, the features of my method and apparatus have special functions when certain substances or certain kinds of substances are acted upon and I have therefore drawn the appended claims of varying scope to protect my method and apparatus broadly and also to cover the more specific combinations of physical elements and process steps which depend upon these special relationships to which I have referred and which I shall describe fully hereinafter.

In order to instruct those skilled in the art in the use of my process and apparatus, I shall refer to a specific process and apparatus, to-wit, a process of securing sodium from sodium chlorid and an apparatus which I have designed and with which I have experimented.

It will simplify this description to explain first the apparatus and I shall, therefore, refer now to the accompanying drawings in which—

Figure 1:
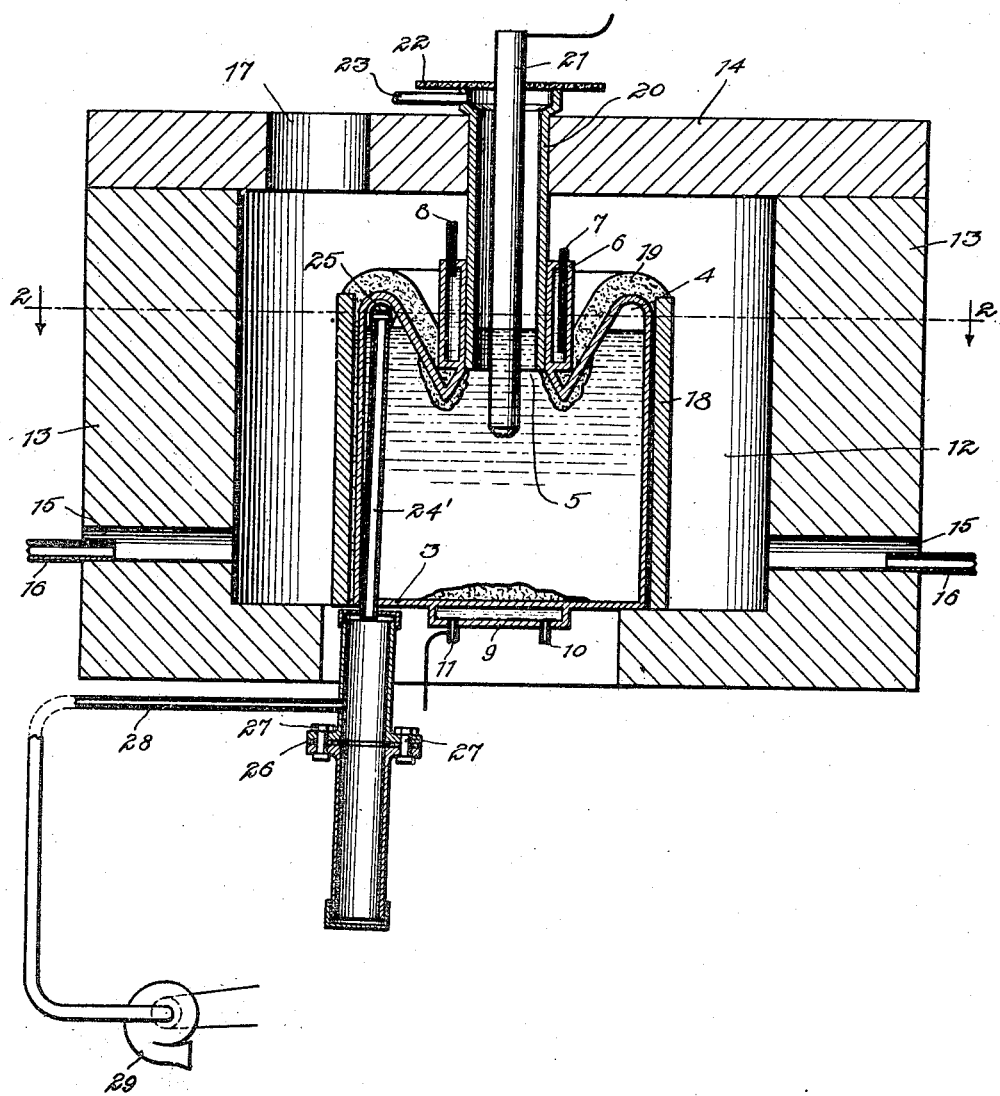
Figure 2:
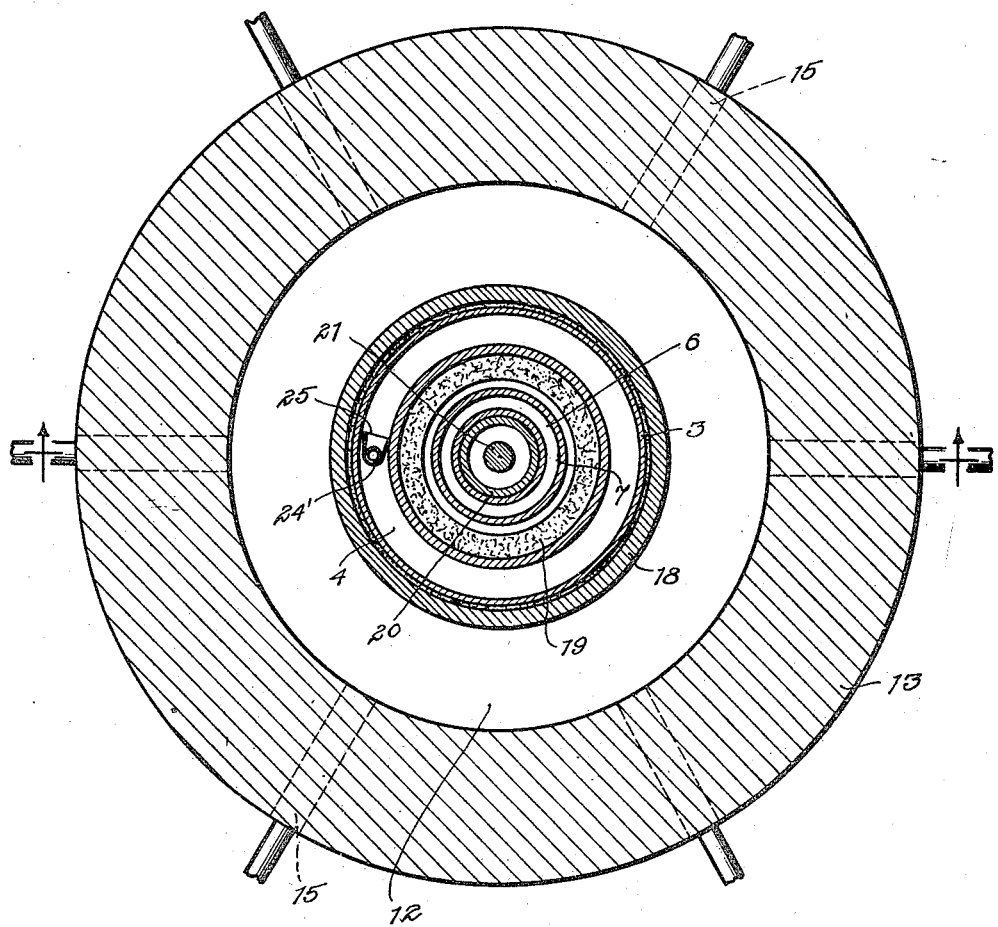

Figure 1 is a vertical axial sectional view of the electrolytic vat of my invention; and Fig. 2 is a horizontal sectional view taken on the plane of the line 2, 2, of Fig. 1 and looking in the direction indicated by the arrows.

The vat itself is indicated at 3 and it will be seen that it is centrally disposed within a combustion chamber. The vat of the specific apparatus which I illustrate is of cylindrical form, the top wall sloping inwardly and downwardly and then upwardly so as to form an annular trap 4 at the top of the vat so as to provide a central opening 5. The opening 5 is surrounded by a water jacket 6 which is provided with the inlet 7 and the outlet 8 whereby a cooling circulation of water may be had. Upon the under side of the bottom of the vat a water box 9 is provided, this water box having the inlet 10 and the outlet 11 so as to provide for a cooling circulation of water. It will appear of importance, as this description proceeds, that the vat shall be cooled where the water jacket and the water box are provided, and it will be understood by those skilled in the art that this cooling influence may be secured in other ways than that specifically described, without departing from the spirit and scope of my invention.

The combustion chamber 12 in which the vat 3 is disposed is formed by the fire brick housing 13, covered by a roof 14, also preferably of fire brick. The circular wall of the fire brick housing is provided at suitable intervals with air ports 15, 15, in each of which a gas pipe 16, fed from a suitable gas supply, extends, thus forming a plurality of gas burners for the combustion chamber 12. An opening 17 is provided in the roof 14 for the exit of the products of combustion.

The vat 3 is closely surrounded by a terracotta pipe 18 between which and the vat a filling of dry fire clay is provided. A fire clay covering 19 is provided on the top of the vat 3, as illustrated, thus completing the protection of the vat itself, which is preferably made of sheet steel.

A pipe 20, supported centrally from the roof 14, extends down into and fits snugly within the opening 5 of the vat 3. A graphite electrode 21 extends down through the pipe 20, being preferably centrally disposed therein and into the vat 3 as illustrated. An asbestos shield 22 covers the annular space around the electrode 21 and a gas exit 23 is provided in the pipe 20. The positive terminal of the source of electric current may be connected with the electrode 21 and the negative terminal thereof may be conveniently connected to the water inlet or outlet for the water box 9, the wall of the vat 3 thus forming the opposite electrode.

Extending upwardly through the bottom of the vat 3 and to the annular trap 4, is a discharge pipe 24' which is provided at its top with a horizontally disposed elongated nozzle 25. Outside of the vat 3, the discharge pipe 24' leads into a receiver which is divided into two portions at 26, the two portions being held together by suitable bolts 27, 27, passing through flanges between which an asbestos gasket is preferably disposed. By this means the lower part of the receiver may be removed so as to remove the desired substance, as caught in the receiver, as will be described.

A pipe 28 leads from the upper part of the receiver to a suction pump 29 which I have indicated diagrammatically in Fig. 1.

Having thus described the apparatus, I shall now proceed to a description of an exemplary process, the winning of sodium from sodium chlorid, as before mentioned.

Dry soduim chlorid is fed into the vat 3 by way of the pipe 20 after removing the asbestos shield 22. The sodium chlorid is maintained in melted condition by means of the heat produced by the $C^2R$ loss, assuming the current to be applied, or the $C^2R$ loss and in addition thereto the external means in the way of the gas burners leading into the combustion chamber, as has been described. The external means is particularly useful and plays its most important part at the time of starting the apparatus. After the operation is well under way, the external heating means may be shut off, maintaining the bath in proper condition by the $C^2R$ loss alone.

The level of the bath of fused sodium chlorid is maintained as shown below the nozzle 25 in the trap 4 and should always be maintained above the bottom of the pipe 20, the condition being observable through the pipe 20 by removing the asbestos shield 22, or by way of some other suitable means.

Due to the presence of the water jacket 6 and the water box 9, which have been described, the inside of the top wall, immediately surrounding the opening 5 of the vat 3, and the top of the bottom wall, directly under the opening 5, are insulated by the formation of layers of solidified sodium chlorid, thus directing the electrolytic action from the outside of the vat 3 toward the center electrode. This action is important since the released sodium naturally rises vertically and should rise through the trap 4 and not to the opening 5 where it would recombine with the freed chlorid, the freed chlorid tending to escape through the pipe 20 and being led therefrom by way of the chlorin exit 23. The sodium, being lighter than the bath, forms a layer on top of the bath within the trap 4 and this layer gradually increases in thickness as the operation proceeds. At proper intervals, however, the pressure in the receiver is reduced by the action of the pump 29 and this consequently causes the level in the trap 4 to rise, overbalancing pressure being allowed to act on the level within the pipe 20. As the level rises within the trap 4 the layer of sodium will overflow through the nozzle 25, into the discharge pipe 24' and into the receiver, the nozzle acting, in effect, as a skimmer. The better practice is to leave always a layer of sodium on top of the bath, skimming only the excess, thus keeping the sodium pure. It may be stated, however, that a slight overflow of sodium chlorid is immaterial. It will be clear that the process and apparatus are such that operation may be carried on continuously, the sodium chlorid being fed either continuously or at regular intervals through the pipe 20, and the skimming action being performed either continuously or intermittently, as preferred. As before noted, the lower part of the receiver may be removed when filled and a similar lower part substituted therefor, if desired.

Several results stand out prominently as of special importance. The metal is produced immediately in its elemental state. Dry chlorin is secured. The apparatus is inexpensive and may be inexpensively operated. The apparatus is of simple construction. The process may be carried on continuously.

While I have already mentioned the general adaptability of the apparatus and process of my invention, it is pertinent to speak of another specific instance of operation, which is of special importance, in addition to the operation described above in detail. This other instance is with reference to the winning of magnesium from magnesium chlorid, in which instance, I supply a bath of potassium chlorid with anhydrous magnesium chlorid, the potassium chlorid being provided to give better current efficiency. In general I may say that the process and apparatus of my invention hold for any metal which will float on the electrolytic bath, and in fact any substance which has a positive or negative electro-response and which will float on the bath.

I claim:

1. The process of decomposing a compound by electrolysis which comprises submitting said compound to an electric current, trapping one of the released substances at one portion of the top of the mass of said compound, and compelling another released substance to pass off at another portion by directing all the electrolytic action transversely from the vertical zone of one of said portions to the vertical zone of the other of said portions.

2. The process of decomposing a compound by electrolysis which comprises submitting said compound to an electric current, trapping one of the released substances at the outer portion of the top of the mass of said compound, and compelling another released substance to pass off at a central portion, by directing all the electrolytic action transversely from the vertical zone of the outer portion to the vertical zone of the central portion.

3. The process of decomposing a compound by electrolysis which comprises submitting said compound to an electric current, trapping one of the released substances at a certain portion of the top of the mass of said compound, and confining the electrolysis alone to that part of said mass directly below said portion.

4. The process of decomposing a metallic chlorid wherein the metal is lighter than the chlorid which consists in maintaining the chlorid in liquid state and submitting it to an electric current to split up the chlorid, trapping the metal at one portion of the surface of the bath, and compelling the escape of the chlorin from another portion of the bath by directing all the electrolytic action transversely from the vertical zone of the first-named portion to the vertical zone of the second-named portion.

5. The process of decomposing a metallic chlorid wherein the metal is lighter than the chlorid which consists in maintaining the chlorid in liquid state and submitting it to an electric current to split up the chlorid, trapping the metal at the outer portion of the surface of the bath, and compelling the escape of chlorin from a central portion of the bath by directing all the electrolytic action transversely from the vertical zone of the outer portion to the vertical zone of the central portion.

6. The process which comprises submitting a compound to an influence which breaks it up and exclusively trapping one of the released substances at the top of the compound.

In witness whereof, I hereunto subscribe my name this 3rd day of January, A. D. 1916.

VICTOR M. WEAVER.